(12) United States Patent
Asnaashari

(10) Patent No.: US 9,317,206 B2
(45) Date of Patent: *Apr. 19, 2016

(54) HOST-MANAGED LOGICAL MASS STORAGE DEVICE USING MAGNETIC RANDOM ACCESS MEMORY (MRAM)

(71) Applicant: Avalanche Technology, Inc., Fremont, CA (US)

(72) Inventor: Mehdi Asnaashari, Danville, CA (US)

(73) Assignee: Avalanche Technology, Inc., Fremont, CA (US)

( * ) Notice: Subject to any disclaimer, the term of this patent is extended or adjusted under 35 U.S.C. 154(b) by 12 days.

This patent is subject to a terminal disclaimer.

(21) Appl. No.: 14/593,896

(22) Filed: Jan. 9, 2015

(65) Prior Publication Data

US 2015/0248238 A1 Sep. 3, 2015

Related U.S. Application Data

(63) Continuation of application No. 14/193,814, filed on Feb. 28, 2014, now Pat. No. 8,947,937.

(51) Int. Cl.
| | |
|---|---|
| *G11C 11/34* | (2006.01) |
| *G11C 16/04* | (2006.01) |
| *G06F 3/06* | (2006.01) |
| *G06F 12/02* | (2006.01) |
| *G06F 12/06* | (2006.01) |

(52) U.S. Cl.
CPC .............. *G06F 3/061* (2013.01); *G06F 3/068* (2013.01); *G06F 3/0614* (2013.01); *G06F 3/0643* (2013.01); *G06F 3/0665* (2013.01); *G06F 3/0688* (2013.01); *G06F 12/0246* (2013.01); *G06F 12/0638* (2013.01)

(58) Field of Classification Search
CPC ..... G06F 12/0246; G06F 12/06; G06F 3/061; G06F 3/0688; G06F 3/0689; G06F 3/0643; G06F 3/0604
USPC .............. 365/185.17, 158; 711/103, E12.008
See application file for complete search history.

(56) References Cited

U.S. PATENT DOCUMENTS

| 8,547,745 B1* | 10/2013 | Asnaashari | 365/185.17 |
|---|---|---|---|
| 8,670,276 B1* | 3/2014 | Asnaashari | 365/185.17 |
| 8,947,937 B1* | 2/2015 | Asnaashari | 365/185.17 |
| 2010/0082890 A1* | 4/2010 | Heo | G06F 12/0246 711/103 |
| 2012/0124276 A1* | 5/2012 | Ahn | G06F 12/0246 711/103 |
| 2013/0042057 A1* | 2/2013 | Sinclair | G06F 3/061 711/103 |

* cited by examiner

*Primary Examiner* — Toan Le

(74) *Attorney, Agent, or Firm* — Maryam Imam; Bing K. Yen

(57) ABSTRACT

A mass storage device includes a storage media with magnetic random access memory (MRAM) devices and a NAND flash interface and NAND flash memory devices that are coupled to the MRAM devices. The storage media has partitions (Logical Units (LUNs)) made of a combination of MRAM and NAND flash memory and further includes a controller with a host interface and a NAND flash interface coupled to the MRAM and NAND flash memory devices through a flash interface. A host is coupled to the controller through the host interface and the storage media communicates attributes to the host, an attribute being associated with one of the partitions, where the host uses the partition based on their attributes to optimize its performance.

8 Claims, 6 Drawing Sheets

# HOST-MANAGED LOGICAL MASS STORAGE DEVICE USING MAGNETIC RANDOM ACCESS MEMORY (MRAM)

CROSS REFERENCE TO RELATED APPLICATIONS

This application is a continuation of U.S. patent application Ser. No. 14/193,814, filed on Feb. 28, 2014, by Mehdi Asnaashari, and entitled "HOST-MANAGED LOGICAL MASS STORAGE DEVICE USING MAGNETIC RANDOM ACCESS MEMORY (MRAM)".

BACKGROUND OF THE INVENTION

1. Field of the Invention

The invention relates generally to a storage device and particularly to a host-managed storage device.

2. Description of the Prior Art

Mass storage devices are used by different hosts to store a variety of data types, such as but not limited to: operating system (OS), boot code, user data, enhanced user data, security parameters. Each of these data types requires distinct storage characteristics and attributes such as high performance, high reliability, frequently accessed, and/or restricted accessibility. For example, typically, the storage device (or "media") that is used for storing the OS requires significantly less memory capacity as compared to that which is used for storing user data yet it is required to be very reliable and high performance to minimize the amount of time expended during power-up (or initialization) of the storage device.

Some user data, such as database index structures, also require reliable and fast storage media and as such fall under an enhanced user data category. Other types of user data such as pictures, songs, videos and movies are typically considered non-critical data and require very large storage or memory capacity, therefore occupying the majority of a storage device that stores the user data. On the other hand however, they do not necessarily require storage residing inside of the storage device that is of high reliability or high performance.

A storage device (also referred to herein as a "mass storage device") can be partitioned into different memory areas with each memory area (also known as a "partitions" or "logical units (LUNs)") having independent logical address ranges and singularly accessible. Moreover, each of these partitions can be defined for a specified use or application and with particular attributes thereby allowing adaptability to different host usage models and Operating System requirements. LUNs can be configured, while within the device, to serve a specific purpose. Each LUN is typically characterized by one or more attributes specified by each memory manufacturer. Examples of attributes to differentiate LUNs properties are as follows:

1. High performance—higher write/read performances vs. more relaxed data reliability in the specified LUN
2. High reliability—the area is characterized by a higher read/write endurance
3. frequently accessed—the area is characterized by a higher read/write accesses
4. Accessibility properties—i.e. ROM LUNs
5. Enhanced user data—high performance and reliability
6. User data—cost sensitive Current solid state mass storage devices are made primarily of NAND flash memories. NAND memories provide large storage at a reasonable price point but they fail to provide all the attributes required by the host that accesses the solid state mass storage device and are inherently slow with limited reliability and endurance, which makes them unattractive for applications requiring the foregoing attributes.

NAND flash memory is generally block-based non-volatile memory with each block organized into and made of various pages. After a block is programmed (or "written to") by, for example the host, it requires erasing prior to being programmed again, which is undesirable for various reasons including extra requisite steps and speed impediment.

Most flash memory require sequential programming of pages within a block. Another limitation of flash memory is that blocks can only be erased for a limited number of times of the life cycle of the flash memory. Unfortunately however, frequent erase operations reduces the life time of the flash memory.

Because flash memory does not allow for in-place updates, that is, it cannot simply overwrite existing data with new data, new data can only be written to an erased area (out-of-place updates), and the old data is required to be invalidated for reclamation in the future. This out-of-place update causes the coexistence of invalid (i.e. outdated) and valid data in the same block.

"Garbage collection" is a process referred to in reclaiming the space occupied by invalid data and where valid data is moved to a new block and the old block is erased. Garbage collection generally and undesirably results in significant performance overhead as well as unpredictable operational latency.

As mentioned above, blocks within a flash memory device can only be erased for a limited number of times. For this reason, wear leveling, a process well known is used to improve the life time of a device made of flash memory by leveling erase operations to blocks to try to distribute the erasure of blocks evenly throughout the blocks and over the entire flash memory (within a band). A typical Multi Level Cell (MLC) NAND flash manufactured using 25 nano meter technology typically has a program/erase (PE) cycle in the range of 1500 to 3000 cycles. Such flash requires erasing prior to being programmed with typical programming time or duration being approximately 10 millionth of a seconds (ms) and a program time for programming a 4 to 8 Kilo Byte page being approximately 1 to 2 ms.

NAND flash memories, despite all their deficiencies, are nevertheless the preferred medium of choice for solid state mass storage devices because of their capacity to save large amounts of data at reasonable prices.

What is needed is a high performance yet reliable mass storage device.

SUMMARY OF THE INVENTION

To overcome the limitations in the prior art described above, and to overcome other limitations that will become apparent upon reading and understanding the present specification, the present invention discloses a method and a corresponding structure for a magnetic storage memory device that is based on current-induced-magnetization-switching having reduced switching current in the magnetic memory.

Briefly, an embodiment of the invention includes a mass storage device with a storage media that includes magnetic random access memory (MRAM) devices and a NAND flash interface and NAND flash memory devices that are coupled to the MRAM devices. The storage media has partitions (Logical Units (LUNs)) made of a combination of MRAM and NAND flash memory and further includes a controller with a host interface and a NAND flash interface coupled to the MRAM and NAND flash memory devices through a flash interface. A host is coupled to the controller through the host interface and the storage media communicates attributes to the host, an attribute being associated with one of the partitions, where the host uses the partition based on their attributes to optimize its performance.

These and other objects and advantages of the present invention will no doubt become apparent to those skilled in the art after having read the following detailed description of the preferred embodiments illustrated in the several figures of the drawing.

IN THE DRAWINGS

DETAILED DESCRIPTION OF THE VARIOUS EMBODIMENTS

Figure 1:
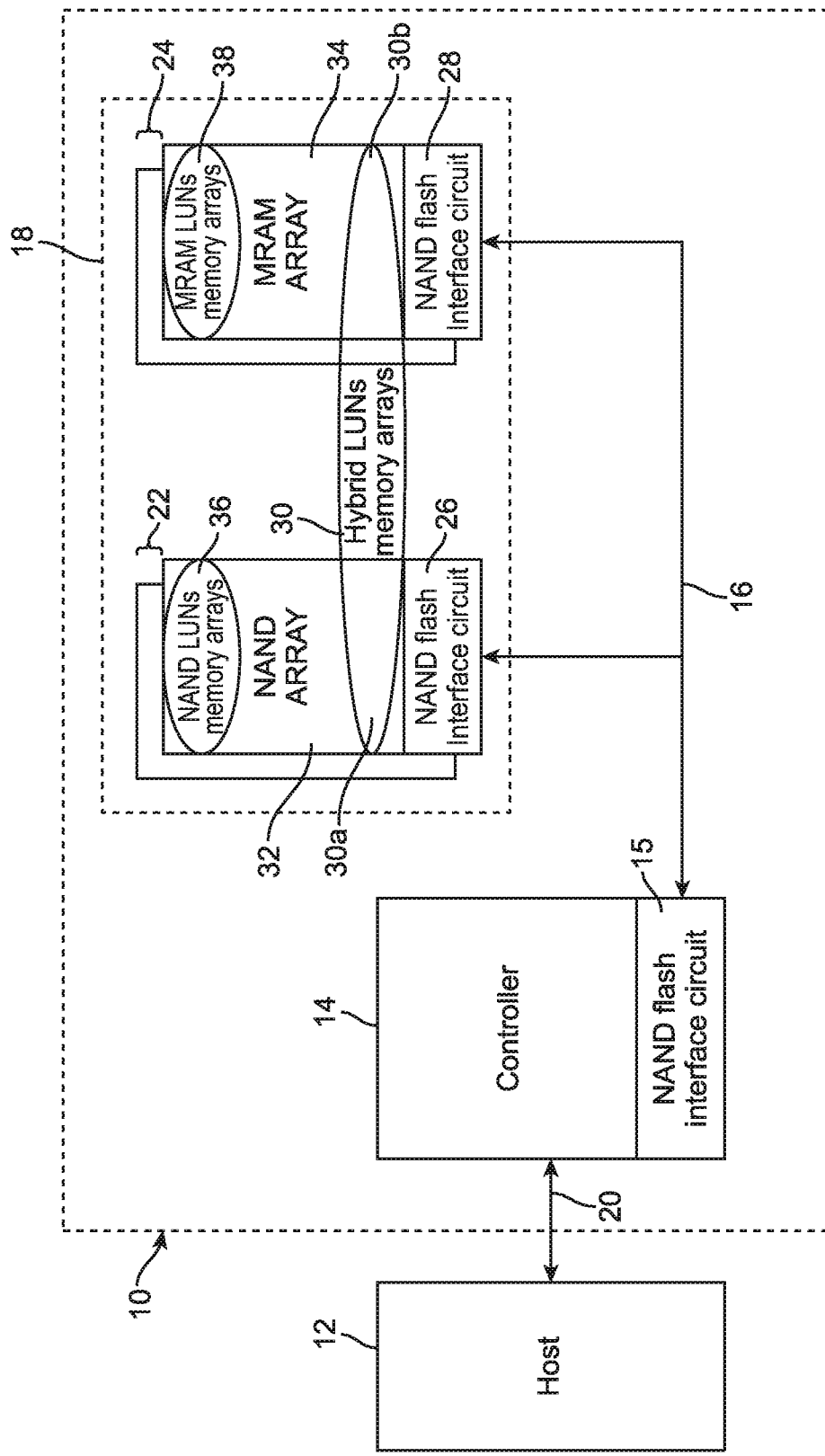
FIG. 1 shows a mass storage device 10, in accordance with an embodiment of the invention.

In the following description of the embodiments, reference is made to the accompanying drawings that form a part hereof, and in which is shown by way of illustration of the specific embodiments in which the invention may be practiced. It is to be understood that other embodiments may be utilized because structural changes may be made without departing from the scope of the present invention.

To enhance user experience yet achieve cost effectiveness, as will be evident using the various embodiments of the invention, NAND flash memories are complemented by using higher performance, reliability and endurance and perhaps more expensive types of media, such as MRAM in the same mass storage device. This allows the host to optimize its performance, reliability, and user experience by using the higher grade media to store its critical data and using the NAND flash memories to store non-critical data.

The host software may partition the mass storage device into a number of LUNs based on device capabilities and resources, where each LUN is mapped to a type of media or combination of different type of media according to that particular LUN utilization.

MRAM and NAND flash memories are combined in a mass storage device to improve a storage device's performance and reliability, among perhaps further benefits. Currently, MRAM devices are more costly than NAND flash memories and fail to provide the capacities that NAND flash memories offer but they are much faster than NAND flash with better reliability and endurance. In the various embodiments that follow, MRAM devices are used by a host to store critical data requiring certain attributes. In combination therewith, NAND flash memories are employed in conjunction with the MRAM devices to allow large amount of storage at a lower cost. NAND flash memory is used by the host for storing non-critical user data, which require large capacity with lower performance, reliability and endurance. Examples of critical data, as previously indicated, are OS, database indexing, and the like. Examples of non-critical data, as previously indicated, include pictures, movies, videos, and on the like.

To simplify integration of MRAM and NAND flash memories into a single device, a MRAM device is disclosed to have an interface compatible with an interface of its counterpart NAND flash device. Furthermore, most of the existing mass storage controllers such as multi-media card (MMC) and universal serial bus (USB) which only support memories with NAND flash interface can use the MRAM devices without any modification to the controllers. In some embodiments, a MRAM device is disclosed to include a NAND flash interface integrated with a known controller and NAND flash memories defining a mass storage device with advantageously different media types to address different system requirements.

In some embodiments of the invention, as will be evident shortly, MRAM memories are mapped into one or more partitions or Logical Unit Numbers (LUNs), and referred to herein as "MRAM LUNs", and provide very high performance and reliable media for data types requiring characteristics described hereinabove.

In some embodiments, NAND flash memories are mapped into one or more partitions or LUNs ("NAND LUNs") and used for storing user data and data types that do not need such stringent requirements. In some embodiments, a combination of MRAM and NAND flash memories are mapped into a LUN ("hybrid LUNs") that only requires high reliability and performance for some of the data being stored therein. A host using such a configuration advantageously utilizes the LUNs based on their attributes.

In some embodiments, LUNs may be pre-configured by the storage device manufacturer and the host merely uses the LUNs based on some prior knowledge. In a more versatile configuration, the storage device reports its storage resources and capabilities such as the capacity of NAND flash memories and MRAM to the host and the host then configures the LUNs according to its requirements.

Referring now to FIG. 1, a mass storage device 10 is shown, in accordance with an embodiment of the invention, to include a host 12, a controller 14, a flash interface 16, and a storage media 18. The controller 14 is shown to include a NAND flash interface circuit 15, the storage media 18 is shown to include a number of NAND flash memory devices 22 and a number of magnetic random access memory (MRAM) devices 24. The devices 22 are shown to include a NAND flash interface circuit 26 and the devices 24 are shown to include the NAND flash interface circuit 28. Further, some of the NAND array 32 defines an area therein that is referred to as "NAND LUNs memory arrays 36" and some of the MRAM array 34 defines an area therein that is referred to as "MRAM LUNs memory arrays 38". A hybrid LUNs memory arrays 30 is shown to span across the devices 22 and 24.

The devices 22 include NAND array 32 and the devices 24 include MRAM array 34. Further, the devices 22 includes NAND LUNs memory arrays 36 and the devices 24 includes MRAM LUNs memory arrays 38.

The host 12 is shown coupled to the controller 14 through a host interface 20 and the controller 14 is shown coupled to the storage media 18 through the flash interface 16. In this manner, the host 12 sends commands, critical and non-critical data, among other types of information to the controller 14, through the host interface 20. Similarly, the controller 14 accesses the devices 22 and 24 through the flash interface 16. Each of the interfaces 20 and 16 are made of interfaces readily known to those in the art.

The hybrid LUNs memory array 30 is made of a combination of a portion of NAND array 32 and a portion of MRAM array 34. The portion of the NAND array 32 of the hybrid LUNs memory arrays 30 is referred to herein as the "hybrid LUNs NAND portion" 30a and the portion of the MRAM array 34 of the hybrid LUNs memory arrays 30 is referred to herein as the "hybrid LUNs MRAM portion" 30b.

In some embodiment, not shown in FIG. 1, a "LUN" includes at least a part of the controller 14.

In operation, the host 12 sends and receives information to and from the controller 14 through the host interface 20. This information is commands and data intended for directing the controller 14 to access the storage media 18 through flash interface 16. Data may be in the form of critical data or non-critical data. Upon receiving non-critical data from the host 12, the controller 14 under the direction of the host 12 writes the non-critical data in the MRAM LUNs memory arrays 38 and hybrid LUNs MRAM portion 30b, as dictated by the host 12. The controller 14 sends and receives information through its interface circuit 15, as does the devices 22 using its interface circuit 26 and as does devices 24 using its interface circuit 28. The interface circuits 15, 26, and 28 are therefore compatible.

The host 12 sends and receives information through the interface 20 using host commands whereas the controller 14 sends and receives information through the interface 16 using flash protocol, well known to those in the art.

In the embodiment of FIG. 1, the storage media 18 includes two types of memory devices, i.e. devices 22 and 24, with each of the devices 22 and 24 having distinct and complementary attributes. For example, the devices 24 are very high in performance and reliability and the devices 22 provide the majority of the capacity for the storage media 18 and are therefore high in capacity.

In one embodiment, controller 14 pre-configures the storage device 18 into a number of NAND LUNs memory arrays 36, MRAM LUNs memory arrays 38 and hybrid LUNs memory arrays 30 during the manufacturing of the storage device 10 (also referred to herein as "mass storage device 10") based on some known knowledge of where and how these the devices 22 and 24 are being deployed (apriori information).

In another more versatile embodiment, the mass storage device 10 reports its resources such as number and type of NAND flash memory devices 22 and MRAM devices 24 to the host 12 during the device initialization and the host 12 configures the mass storage device 10 according to its storage utilization requirements. The mass storage device 10 stores the configuration information in the storage device 18 and uses the same to report to the host 12 for the subsequent power-on cycles.

In yet another embodiment, both host and device store the configuration information and restore it during subsequent power on cycle based on some unique characteristics of the device such as Vendor ID, product ID and serial numbers.

Figure 2:
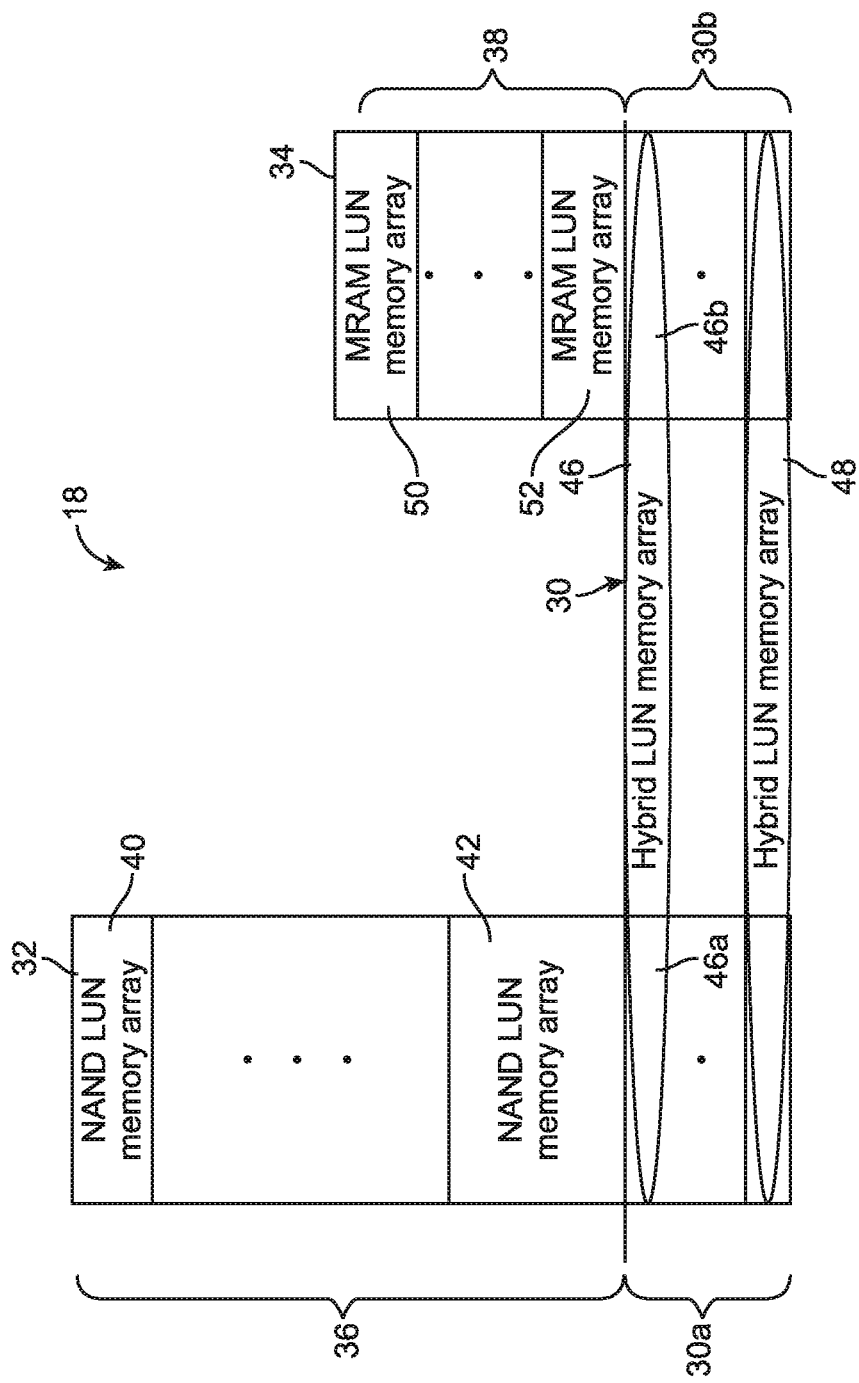
FIG. 2 shows further details of the NAND LUN 36, the MRAM LUN 38, and the hybrid LUN 30 of the storage media 18, in accordance with another embodiment of the invention.

FIG. 2 shows further details of the physical representation of the NAND array 32 of NAND flash memory devices 22 and the MRAM array 34 of MRAM devices 24. The NAND array 32 is shown made of NAND LUNs memory arrays 36 and of hybrid LUNs NAND portion 30a. The MRAM array 34 is shown made of MRAM LUNs memory arrays 38, and hybrid LUNs MRAM portion 30b in accordance with another embodiment of the invention. The hybrid LUNs memory arrays 30 is made of hybrid LUNs NAND portion 30a and hybrid LUNs MRAM portion 30b and is shown made of a number of hybrid LUNs memory arrays, such as hybrid LUN memory array 46 through the memory array of hybrid LUN 48. The hybrid LUN memory array 46 through the hybrid LUN memory array 48 may be of different size and be constructed of different combination of MRAM array 38 and NAND array 36. The NAND LUNs memory arrays 36 is shown partitioned into a number of NAND LUN memory array 40 through NAND LUN memory array 42. The MRAM LUNs memory arrays 38 is shown partitioned into a number of MRAM LUN memory array 50 through MRAM LUN memory array 52.

Figure 3:
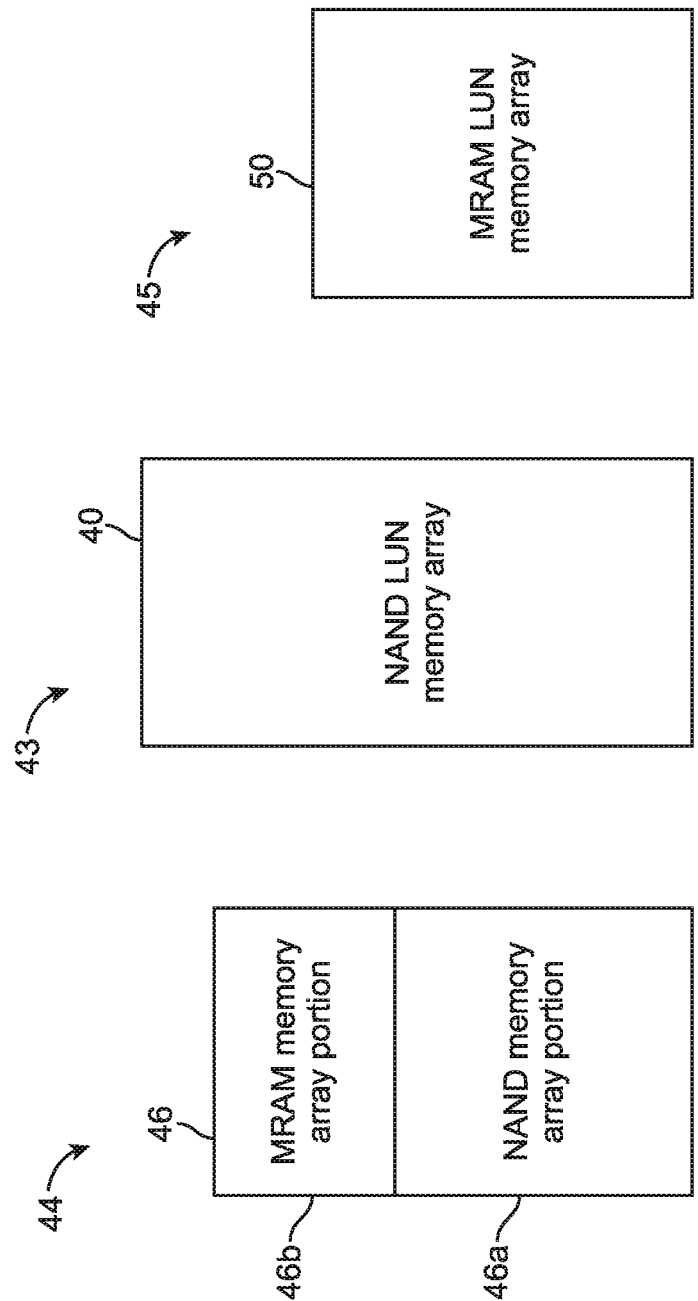
FIG. 3 shows an exemplary representation, using logical addresses, of LUNs 30, 36, and 38, each with distinct attributes.

FIG. 3 shows an exemplary logical representation of memory arrays of LUNs 44, 43, and 45, each with distinct attributes. The hybrid LUN 44 is made of mixed memory array 46; hybrid LUN MRAM portion 46b and hybrid LUN NAND portion 46a and provides a mixed attribute LUN to the host 12. NAND LUN 43 is made of NAND LUN memory array 40 and only provides attributes associated with the NAND flash memory devices 22. MRAM LUN 45 is made of MRAM LUN memory array 50 and only provides attributes associated with MRAM devices 24.

Figure 4:
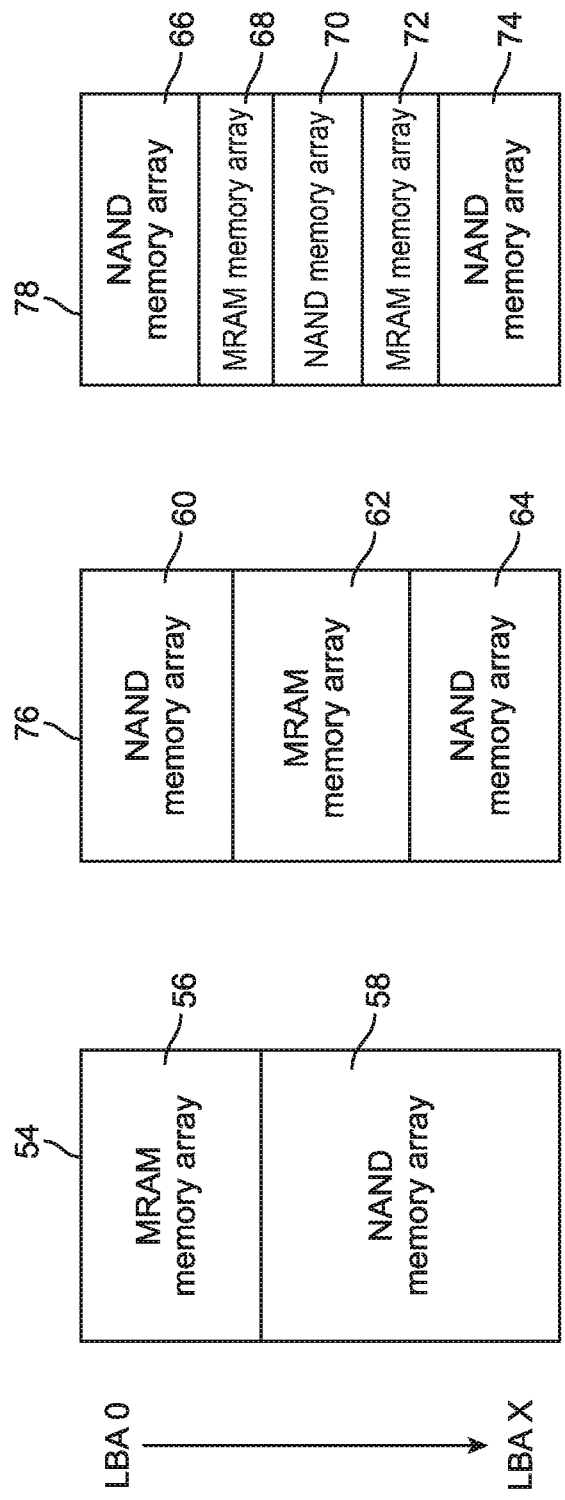
FIG. 4 shows exemplary hybrid LUNs, in accordance with an embodiment of the invention.

FIG. 4 shows exemplary logical representation of different type of memory arrays of hybrid LUNs, in accordance with an embodiment of the invention. Each of the LUNs 54, 76, and 78 may be the hybrid LUNs including memory arrays 30 of FIG. 1. In FIG. 4, the hybrid LUN 54 is shown to include the MRAM memory array portion 56 on the lower logical block addresses (LBAs) and the NAND memory array portion 58 at the higher LBAs. The hybrid LUN 76 is shown to include the MRAM memory array portion 62 in the middle of the LBA range and two NAND memory array portions 60 and 64 at the lower and the higher LBA range of a LUN in accordance with another embodiment of the invention. The LUN 78 is shown to include two MRAM memory array portions 68 and 72 at two different LBA ranges and three NAND memory array portions 66, 70 and 74 at the lower, middle and upper LBA range of a LUN. These exemplary logical representations of different memory arrays of a LUN are to demonstrate that LUNs may of any size. Furthermore, MRAM memory array portion and NAND memory array portion of hybrid LUNs may be any size and occupy various portion of the LUN logical address space range.

Figure 5:
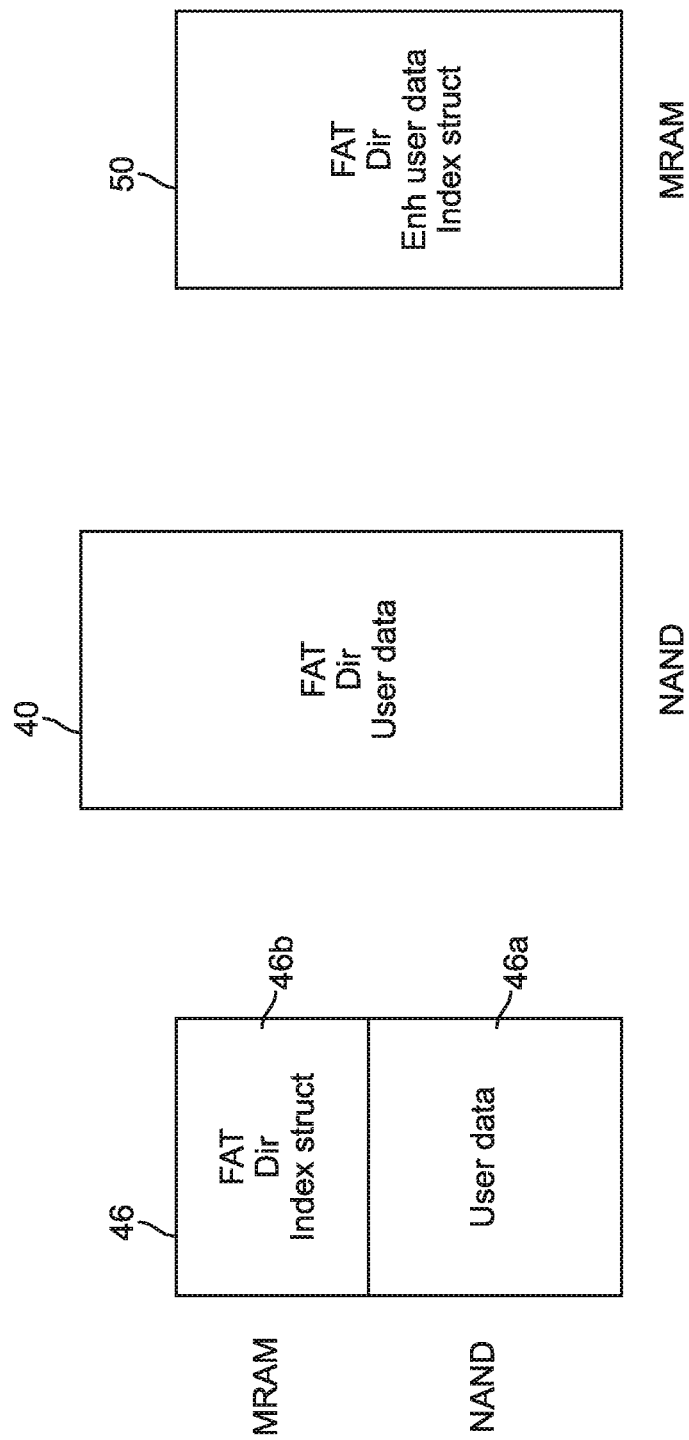
FIG. 5 shows exemplary types of data stored in each of the LUNs 30, 36 and 38, in accordance with an embodiment of the invention.

FIG. 5 shows exemplary types of data stored by the host 12 in memory arrays of each of the LUNs 46, 40 and 50, in accordance with an embodiment of the invention. Exemplary information that is stored in the MRAM portion 46b of hybrid LUN 46 includes the operating system's file allocation tables (FAT), directories, and index structure which are frequently accessed and effect system performance. Exemplary information that is stored in the NAND portion 46a of the hybrid LUN 46 includes user data, which typically are not accessed as often as the type of data that is stored in the MRAM portion 46b, such as critical data. The NAND LUN 40 is made up of only NAND memory array and has to hold all associated with that LUN including FAT, directories and user data. The MRAM LUN 50 is all made up of high performance MRAM array and it should be used by the host to store the FAT, directories, enhanced user data, and database index structures. This LUN provides the highest performance and should be used by host accordingly.

Figure 6:
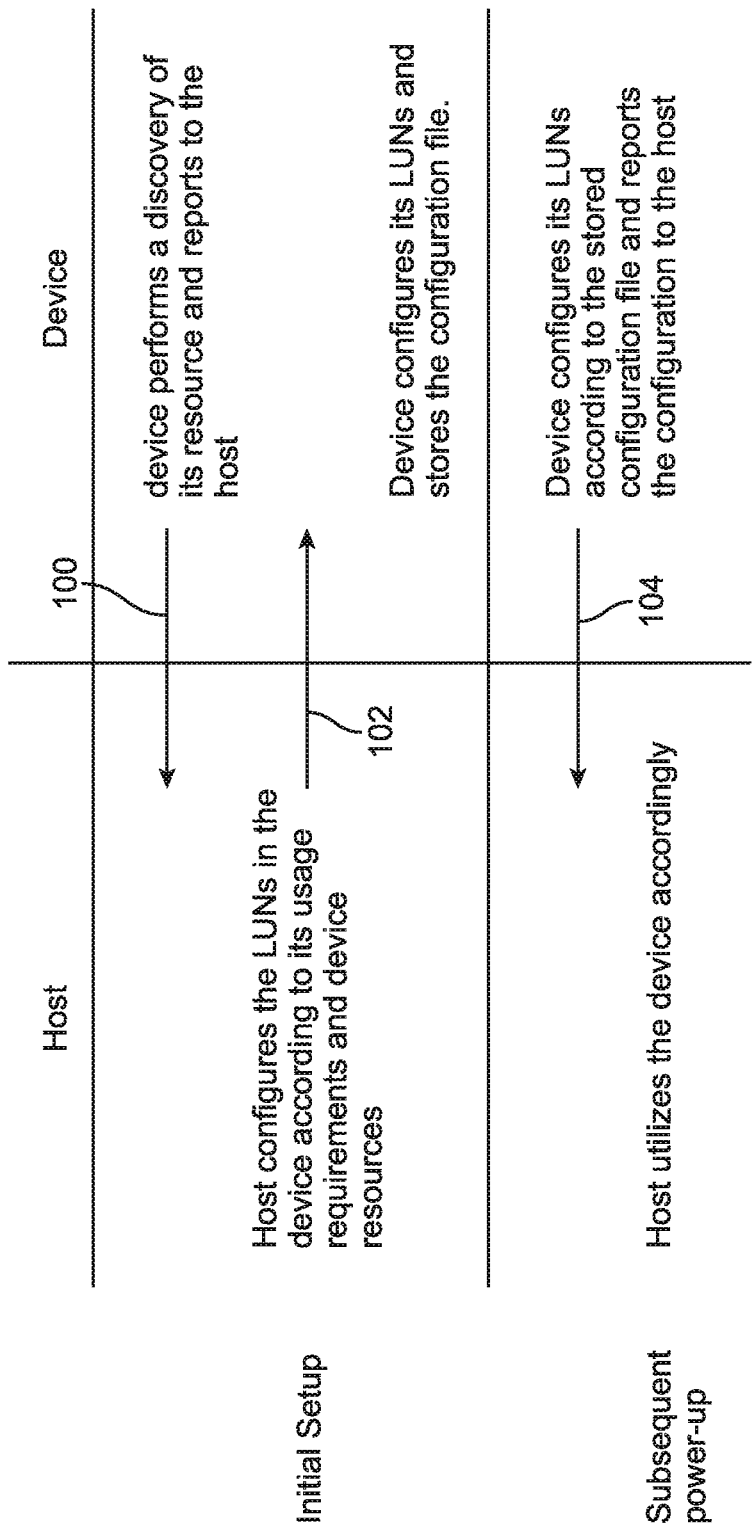
FIG. 6 shows the steps performed by the device 10 of FIG. 1 during initialization by the host 12, in accordance with a method of the invention.

FIG. 6 shows the steps performed by the device 10 and the host 12 of FIG. 1 during initialization, in accordance with a method of the invention. These steps are initiated by the host 12 and directed to the controller 14 of the device 10.

In FIG. 6, at 100, the controller 14 discovers the number and type of memory arrays in device 10 and reports these resources to the host 12, for example, whether and how many NAND devices 22 vs. MRAM devices 24 the storage media 18 has and next, at 102, the host 12 configures the LUNs in the device 10 in accordance with the usage requirements and the device resources. The device 10 configures itself accordingly and stores the configuration file. Subsequently, at 104, the device 10 configures itself according to the stored configuration file and reports the configuration to the host 12.

Thus, in accordance with the various embodiments and methods of the invention, the storage device having different memory media, i.e. MRAM and NAND memories, is disclosed with the MRAM having an read and write access time that are substantially faster than that of the NAND memory. Further, MRAM does not require to be erased before it is re-programmed. Therefore, the need for tables and table management is eliminated. Applications benefitting from this approach are many some of which include those with small IO and partial page operations. Additionally, garbage collection and wear leveling are eliminated. Because MRAM has higher endurance and reliability and it does not require dynamic and static wear leveling, data remains in the media for a much longer time. NAND provides large amounts of capacity in a cost effective way. According to the foregoing, the storage device, such as the device 10, is advantageously capable of creating and managing LUNs with different attributes as a result of the combination of MRAM and NAND.

In some embodiments, the host configures the LUNs on the device based on the device resources and its requirements. Further, the host utilizes the LUNs based on their attributes and cleverly uses the MRAM LUN for critical data. Further, the host cleverly uses the NAND flash for non-critical data.

It is contemplated that memory other than MRAM, having suitable performance and endurance, such as but not limited to, resistive RAM, phase change memory, can be used in place of the MRAM devices 24 without departing from the scope and the spirit of the invention.

Although the invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A storage device in communication with a host to transfer data thereto and therefrom, the storage device comprising:
a storage media including a memory and a non-volatile memory, the memory and non-volatile memory having distinct attributes, the storage media including one or more hybrid logical unit (LUN) memory arrays made of at least a portion of the memory and at least a portion of the non-volatile memory, each portion of the memory and non-volatile having an attribute, the attribute of the portion of the memory being distinct from the attribute of the portion of the non-volatile memory, the LUN memory arrays utilized by the host to store data based on the attributes of the portion of the memory and the attributed of the portion of non-volatile memory to substantially optimize performance thereof.

2. The storage device of claim 1, wherein critical data is stored in the portion of the memory and non-critical data is stored in the portion of the non-volatile memory.

3. The storage device of claim 2, wherein the critical data includes file allocation tables (FAT), directories, index structures, enhanced user data, or any combination thereof.

4. The storage device of claim 1, wherein a capacity of the non-volatile memory is greater than a capacity of the memory.

5. The storage device of claim 1, wherein the attributes of the memory and the non-volatile memory includes grade thereof, the grade of the memory being greater than the grade of the non-volatile memory.

6. The storage device of claim 1, wherein the memory is resistive RAM or phase change memory.

7. The storage device of claim 1, wherein the non-volatile memory is resistive RAM or phase change memory.

8. The storage device of claim 1, wherein the non-volatile memory includes NAND memory and the memory includes magnetic random access memory (MRAM), resistive memory, or phase change memory.

* * * * *